(12) United States Patent
Mackin

(10) Patent No.: US 9,167,000 B2
(45) Date of Patent: Oct. 20, 2015

(54) DYNAMIC THREAT EVENT MANAGEMENT SYSTEM AND METHOD

(75) Inventor: Kelly Jolie Mackin, Portland, OR (US)

(73) Assignee: CA, Inc., New York, NY (US)

( * ) Notice: Subject to any disclaimer, the term of this patent is extended or adjusted under 35 U.S.C. 154(b) by 2162 days.

(21) Appl. No.: 11/353,828

(22) Filed: Feb. 14, 2006

(65) Prior Publication Data

US 2007/0192865 A1   Aug. 16, 2007

(51) Int. Cl.
*H04L 29/00* (2006.01)
*H04L 29/06* (2006.01)
*G06F 21/55* (2013.01)

(52) U.S. Cl.
CPC ............ *H04L 63/1441* (2013.01); *G06F 21/55* (2013.01)

(58) Field of Classification Search
USPC .............................................. 709/229; 726/22
See application file for complete search history.

(56) References Cited

U.S. PATENT DOCUMENTS

| 5,606,668 | A | | 2/1997 | Shwed | 395/200.11 |
| 5,948,104 | A | * | 9/1999 | Gluck et al. | 726/24 |
| 5,987,611 | A | | 11/1999 | Freund | 713/201 |
| 6,088,804 | A | | 7/2000 | Hill et al. | 713/201 |
| 7,213,260 | B2 | * | 5/2007 | Judge | 726/3 |
| 7,243,374 | B2 | * | 7/2007 | Howard et al. | 726/25 |
| 2002/0112185 | A1 | * | 8/2002 | Hodges | 713/201 |
| 2005/0018618 | A1 | * | 1/2005 | Mualem et al. | 370/252 |
| 2006/0026670 | A1 | * | 2/2006 | Potter et al. | 726/7 |

FOREIGN PATENT DOCUMENTS

| EP | 0 833 489 A2 | 4/1998 | H04M 3/36 |
| EP | 1 418 484 A2 | 5/2004 | G06F 1/00 |
| WO | WO 01/84285 A2 | 11/2001 | G06F 1/00 |

OTHER PUBLICATIONS

Notification of Transmittal of the International Search Report and the Written Opinion of the International Searching Authority for International Application No. PCT/US2007/002173; 13 pages, Oct. 4, 2007.

* cited by examiner

*Primary Examiner* — Brandon Hoffman
*Assistant Examiner* — Michael D Anderson
(74) *Attorney, Agent, or Firm* — Baker Botts L.L.P.

(57) ABSTRACT

According to various illustrative embodiments of the present invention, a method for a content-driven threat management system includes creating a threat detection primary object with threat mitigation data using at least one researcher of at least one of software and malicious code, encoding the threat detection primary object with threat mitigation data within an object capable of being transmitted to a personal computer system using a transmission vector update function, and transmitting the threat detection primary object with threat mitigation data to a threat agent using the transmission vector update function. The method also includes updating at least one threat function using the threat agent to update at least one threat functional description of the at least one threat function to include the threat detection primary object with threat mitigation data, and using the threat detection primary object with threat mitigation data to be capable of recognizing at least one threat event based upon the threat detection primary object with threat mitigation data.

21 Claims, 4 Drawing Sheets

DYNAMIC THREAT EVENT MANAGEMENT SYSTEM AND METHOD

TECHNICAL FIELD OF THE INVENTION

The present invention relates generally to information processing and, more particularly, to systems and methods for regulating access and maintaining security of individual computer systems and local area networks (LANs) connected to larger open networks (wide area networks or WANs), including the Internet.

BACKGROUND OF THE INVENTION

The first personal computers (PCs) were largely stand-alone devices with no direct connection to other computers or computer networks. Data exchanges between computers were mainly accomplished by exchanging magnetic or optical media such as floppy disks. Over time, more and more computers were connected to each other using Local Area Networks or "LANs." In both cases, maintaining security and controlling what information a user of a personal computer could access was relatively simple because the overall computing environment was limited and clearly defined.

With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer® or Netscape Navigator® browser software) or other "Internet applications." Browsers and other Internet applications include the ability to access an URL (Universal Resource Locator) or "Web" site. The explosive growth of the Internet had a dramatic effect on the LANs of many businesses and other organizations. More and more employees need direct access through their corporate LAN to the Internet in order to facilitate research, business transactions, consumer transactions, and communications between branch offices, and to send and receive e-mail messages, to name just a few common applications.

As a result, corporate IS (Information Systems) departments and connected device users now face unprecedented challenges. Specifically, such departments, which have until recently operated largely in a clearly defined, controlled, and "friendly" environment, are now confronted with a far more complicated and hostile connection situation. As more and more computers are connected to the Internet, either directly (e.g., over a dial-up connection with an Internet Service Provider or "ISP") or through a gateway between a LAN and the Internet, a whole new set of challenges face LAN administrators and individual users alike: these previously-closed computing environments are now opened to a worldwide network of computer systems. Specific challenges, for example, include the following: (1) attacks by perpetrators (hackers) capable of damaging the local computer systems, (2) unauthorized access to external data (e.g., pornographic and/or other unsuitable Web sites), (3) infiltration by viruses and/or "worms" and/or spyware and/or "Trojan Horse" programs as well as surreptitious installation of "spyware" applications and other types of malicious code that leak device, organizational, and personal information to unknown sources, (4) use of the local computer system for unauthorized personal activities (e.g., extensive Web browsing or game playing) with subsequent loss of productivity, and (5) hording available network bandwidth through use of bandwidth-intensive applications (e.g., real-time audio programs).

To mitigate system security issues, the software industry has introduced a myriad of products and technologies to address and minimize these events, including "firewalls," proxy servers, and similar technologies—all designed to keep outside hackers from penetrating the corporate network. Corporate firewalls are applications that intercept the data traffic at the gateway to a wide area network (WAN) and try to check the data packets (i.e., Internet Protocol packets or "IP packets") being exchanged for suspicious or unwanted activities. Initially, firewalls have been used primarily to keep intruders from the LAN by filtering data packets. More recently, the concept has been expanded to include "Stateful Inspection." Here, a firewall not only looks at the IP packets but also inspects the data packets' transport protocol (e.g., transmission control protocol or "TCP") header, and even the application level protocols, in an attempt to understand better the exact nature of the data exchange. These technologies are now beginning to appear on the end user devices as well.

Proxy server or Application Gateways, on the other hand, are LAN server-based applications that act on behalf of the client application. Accessing the Internet directly, the application first submits a request to the proxy server that inspects the request for unsafe or unwanted traffic. Only after this inspection will the proxy server consider forwarding the request to the destination on the Internet.

Both strategies are based on a centralized filter mechanism, with most of the filtering work being performed on a remote system or server (as opposed to the individual client PCs). Such an approach is problematic, however. Because of the centralized nature of firewalls and proxy servers, each approach extracts significant performance penalties. During operation of a typical system employing either approach, a single server might have to do the filtering work for hundreds or even thousands of PCs or workstations, creating a problem called "latency." Latency represents a major bottleneck to overall system performance from the perspective of both the end user and the network systems designer. As emerging technologies on the Internet require still faster data delivery (e.g., real-time audio and video feeds) and use more complex protocols, this problem will likely be exacerbated. In the case of firewalls employing "Stateful Inspection" technology, performance problems are aggravated by the fact that the firewall software needs to duplicate much of the protocol implementation of the client application as well as the transport protocol (e.g., TCP and/or user datagram protocol or "UDP") in order to understand the data flow.

As another problem, centralized filter architectures are missing vital information to correctly interpret the data packets because the underlying protocols were designed for effective data transfer and not for data monitoring and interception. For instance, monitoring based on an individual client application (or versions thereof) is not supported, all despite the fact that two identical data packets (or series of data packets) can have completely different meanings based on the underlying context, i.e., how the client application actually interprets the data packets. As a result, computer viruses and/or Trojan Horse applications can camouflage data transmissions as legitimate traffic.

The base of computer users has become increasingly mobile. This mobility has created markets for devices that are sometimes part of the centralized computing architecture and at other times "outside" the organizational network and the domain of policies of the organizational network. This mobililty pits the extreme utility of such devices, and their relationship to productivity, against the need to manage access to services and transactions on the Internet.

There are still other disadvantages to centralized filtering. The approach is difficult to configure and administer. The task of setting up different rights for different users, workstations, and/or workgroups, for instance, is particularly difficult. No facilities are provided for delegating certain access and monitoring authority, for example, in order to allow a workgroup supervisor to manage less critical aspects of the Internet access for his or her group without going through a central authority. Also, a centralized filter cannot distinguish between "active" use of the Internet (i.e., when user interaction with the PC causes the Internet access) and "background" use (i.e., when an application accesses the Internet without user interaction). Still further, a centralized filter is easily circumvented, for example, by a user employing a modem for establishing a dial-up connection to an ISP (Internet Service Provider). Similarly, the proxy-server approach is unattractive. Special versions and/or specialized configurations of client applications are required, thus complicating system administration. Internet setup for portable computers employed at remote locations is especially complicated.

Providing a client-based filter (e.g., SurfWatch and CyberPatrol) for preventing users from accessing undesirable World Wide Web sites does not adequately overcome the disadvantages of centralized filtering. Designed largely as parental control tools for individual PCs, these programs are easily disabled by uninstalling (accidentally or intentionally) the filter. A Windows user can, for example, simply reinstall Windows, replacing certain driver files of the filter. This disables the filter and provides the user with unrestricted access to the Internet.

Current threat management technologies typically utilize a "one-off" functional approach, such as spyware, a firewall, anti-virus (AV) software, a spam filter, a universal resource locator (URL) filter, and the like. The technical limitations of such an approach are numerous and the challenges of threat mitigation can not meaningfully be met by such piecemeal approaches that are neither contentdriven nor specific. For example, an intrusion is seen by current threat management technologies as a firewall event, even though the intrusion might be connected to a Trojan Horse that is part of a virus and/or a worm and/or a spyware event. Similarly, an URL filtering product is aware of a "known bad website" where Trojan Horses and/or other damaging code are known to exist, but the URL filtering product has no way to communicate with the firewall product and/or the firewall product has no way to communicate with the URL filtering product. Likewise, a conventional Security Advisor (SA) becomes aware of, and publishes, specific content regarding a type of threat event, but this specific content is not connected to other functional conventional threat management technologies.

The nature of Internet threats is constantly changing. The authors of these threat are now combining threats into coordinated attacks. For example, an author might create and/or use an off-the-shelf virus, and combine that virus with a worm and/or a Trojan Horse, and then design those malicious software (malware) applications to send information to another Internet device and/or download spyware, keyloggers, Trojan Horses, rootkits, and/or other malicious software (malware) to the end-user device. Whole nefarious networks of infected devices now exist.

U.S. Pat. No. 5,987,611 to Freund, for example, discloses an administrator creating rules that are then sent to a desktop and/or a server. These rules are then used to configure the software firewall installed on the system. However, this configuration does not account for the case where the threat-driven content, such as an anti-virus (AV) signature file, directs the creation and/or distribution of a rule, since the administrator is necessarily involved in the creation and/or distribution of all the rules.

SUMMARY OF INVENTION

According to various illustrative embodiments of the present invention, a method for a content-driven threat management system includes creating a threat detection primary object with threat mitigation data using at least one researcher of at least one of software and malicious code, encoding the threat detection primary object with threat mitigation data within an object capable of being transmitted to a personal computer system using a transmission vector update function, and transmitting the threat detection primary object with threat mitigation data to a threat agent using the transmission vector update function. The method also includes updating at least one threat function using the threat agent to update at least one threat functional description of the at least one threat function to include the threat detection primary object with threat mitigation data, and using the threat detection primary object with threat mitigation data to be capable of recognizing at least one threat event based upon the threat detection primary object with threat mitigation data.

The system and method disclosed herein are advantageous in providing a mechanism for relaying content-driven information to the various functions that are enabled in a threat management system. In various illustrative embodiments, information created by content, such as the detection of a specific threat, and its associated mitigation settings, may be enabled to be transmitted to another threat management function, allowing that other threat management function to reconfigure itself to respond to the new information. In various illustrative embodiments, the researcher(s) of software and/or malicious code, which may include one or more automated researcher(s) and/or automated research system(s) built to develop threat information, may encode the threat detection primary object with threat mitigation data, role information, and/or generalized threat migration settings, which can determine firewall, AV, spyware, and/or policy configuration(s), and any and all other threat mitigation settings that might be positively operative within the computer system within the object capable of being transmitted to a personal computer system using a transmission vector update function. The system and method disclosed herein are still further advantageous in improving the performance and security of business critical applications and, hence, in improving the user and/or customer experience. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

The following description will focus on various illustrative embodiments, which may be operative in an Internet-connected environment, including, for instance, client machines running under the Microsoft® Windows® environment and connected to an open network, such as a wide area network (WAN) and/or the Internet. The present invention, however, is not limited to any particular one application or any particular environment. Instead, those skilled in the art having the benefit of the present disclosure will find that the system and methods of the present invention may be advantageously applied to a variety of system and application software, including database management systems, word processors, spreadsheets, and the like, operating on a variety of different platforms, including the Macintosh® operating system, the UNIX® operating system, the NextStep® operating system, and the like. Therefore, the description of the exemplary embodiments that follows is for purposes of illustration and not limitation.

System Architecture

System Hardware (for Client and/or Server Machines)

Figure 1:
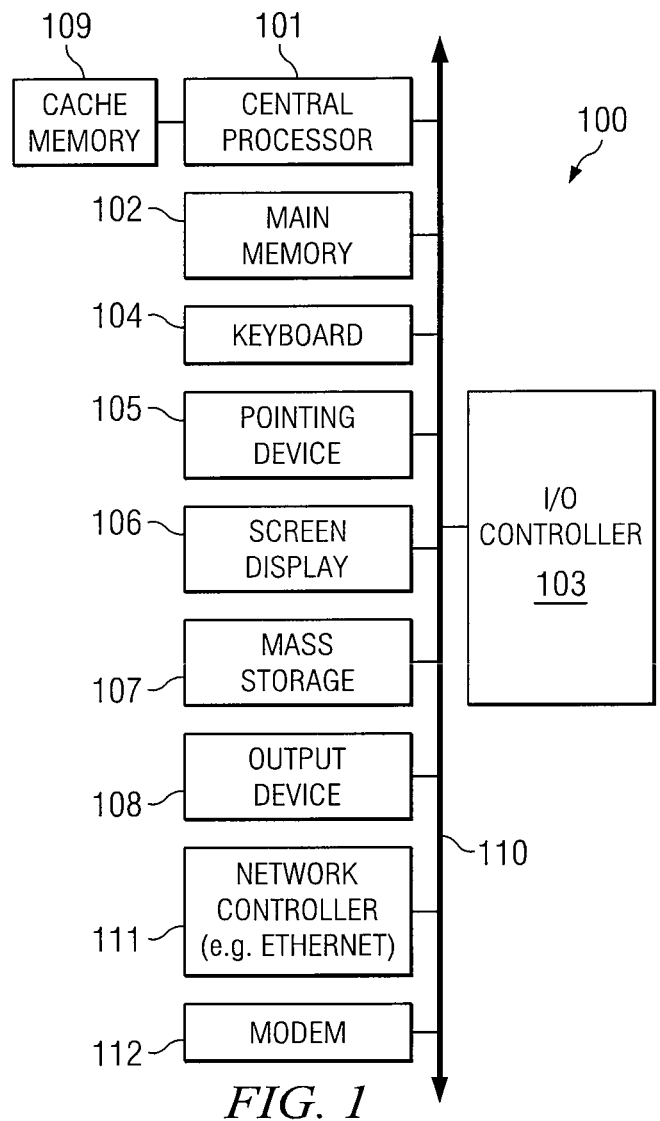
FIG. 1 schematically illustrates a block diagram showing a computer system, according to teachings of the present disclosure.

Various illustrative embodiments may generally be embodied on an information processing system including one or more computer systems, such as a computer system 100 of FIG. 1, operating on a network. The computer system 100 may comprise a central processor 101, a main memory 102, an input/output controller 103, a keyboard 104, a pointing device 105 (e.g., a mouse, a track ball, a pen device, and/or the like), a display and/or screen device 106, and a mass storage 107 (e.g., a hard disk or a fixed disk, a removable floppy disk, an optical disk, a magneto-optical disk, a flash memory, and/or the like), a network interface card or controller 111 (e.g., Ethernet, Firewire, and/or the like), and a modem 112 (e.g., a 56 K baud modem, an ISDN modem, and/or the like). Although not shown separately, a real-time system clock may be included with the computer system 100, in a conventional manner. The computer processor 101 may include and/or be coupled to a cache memory 109 for storing frequently accessed information. The cache memory 109 may be an on-chip cache and/or an external cache (as shown). One or more input/output (I/O) device(s) 108, such as a printing device and/or a slide output device, may be included in the computer system 100, as desired. As shown, the various components of the computer system 100 may communicate through a system bus 110 and/or a similar architecture. The computer system 100 itself may communicate with other computer systems via the network interface card 111 (e.g., available from 3Com) and/or the modem 112 (e.g., available from U.S. Robotics). In various particular embodiments, the computer system 100 may include an IBM PC-compatible personal computer, available from a variety of vendors (including IBM of Armonk, N.Y., for example). The I/O device 108 may include a laser printer, such as an HP LaserJet printer, which is available from Hewlett-Packard of Palo Alto, Calif., for example.

System Software (for Controlling Clients and Server Machines)

Figure 2:
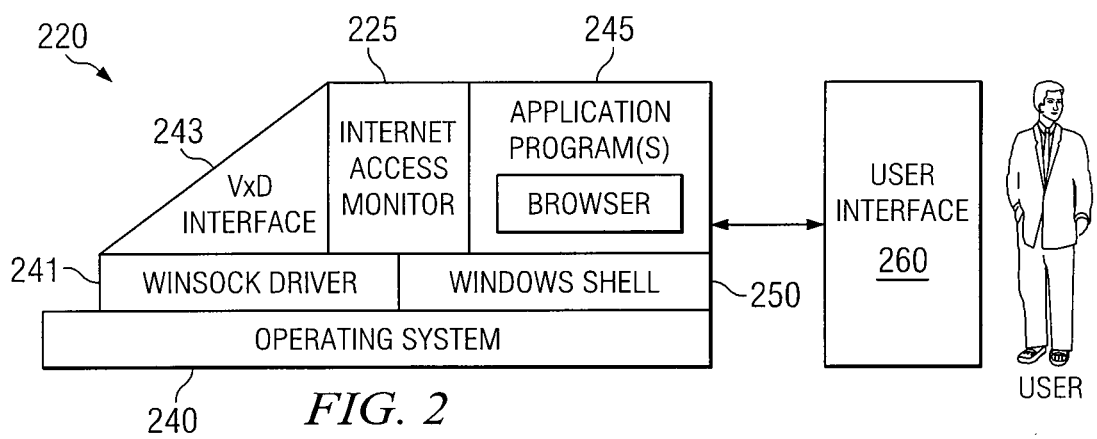
FIG. 2 schematically illustrates a block diagram showing an exemplary embodiment of a computer software system for controlling the operation of the computer system of FIG. 1, according to teachings of the present disclosure.

As schematically illustrated in FIG. 2, a computer software system 220 may be provided for directing the operation of the computer system 100. The software system 220, which may be stored in the computer system 100 main memory 102 and on the mass storage 107 (e.g., the disk memory), may include a kernel or operating system (OS) 240 and a windows shell 250. One or more application programs, such as client application software or "programs" 245 may be "loaded" (i.e., transferred from the mass storage 107 into the main memory 102) for execution by the computer system 100. In various particular embodiments, the client application software 245 may include a Web browser (e.g., Netscape Navigator® and/or Microsoft Internet Explorer® and/or Mozilla Firefox browser software) that may communicate through a communication layer and/or driver 241 (e.g., Winsock) with the Internet.

The computer software system 220 may include a user interface (UI) 260, preferably a Graphical User Interface (GUI), for receiving user commands and data, although this system might also be embedded and not exhibit a traditional interface. These inputs, in turn, may be acted upon by the computer system 100 in accordance with instructions from the operating system module 240, the windows shell 250, and/or the client application module(s) 245. The UI 260 may also serve to display the results of operation(s) from the OS 240, the windows shell 250, and/or one or more of the application(s) 245, whereupon the user may supply additional inputs and/or terminate the session. The OS 240 and the windows shell 245 may be provided by Microsoft® Windows XP, Microsoft® Windows 2000, Microsoft® Windows 95, Microsoft® Windows NT, and/or Microsoft® Windows 3.x (operating in conjunction with MS-DOS), some or all of which may be available from Microsoft Corporation of Redmond, Wash., for example. Alternatively, the OS 240 and the windows shell 245 may be provided by IBM OS/2® (available from IBM of Armonk, N.Y.) and/or Macintosh® OS (available from Apple Computers of Cupertino, Calif), for example. Although shown conceptually as a separate module, the UI 260 may alternatively be provided by interaction of the application modules 245 with the windows shell 250, both operating under the OS 240.

In various illustrative embodiments, the computer software system 220 may include a client-side Internet access monitoring module 225. The Internet access monitoring module 225 may interface directly with the Winsock driver 241 via a Windows VxD driver interface surfaced by the Winsock driver 241, as shown at 243. Construction and operation of the client-side Internet access monitoring module 225, including its interaction with server-based components, may be as described in further detail in U.S. Pat. No. 5,987,611 to Freund, for example, incorporated by reference herein.

Internet Protocols

In order to facilitate understanding of various illustrative embodiments, it may be helpful to review the basic architecture of the Internet and techniques for providing Internet access. For clarity, the following description of the Internet architecture focuses on those aspects which are relevant to various illustrative embodiments.

The Internet is essentially an open network of computers and local area networks (LANs). Computers within this open network communicate using multiple protocol layers. Each of the layers addresses a distinct concern of the communication process. As a core protocol of the Internet, Internet Protocol (IP) provides a layer for exchanging data packets between computers connected to the Internet, including providing data encapsulation and header formatting, data routing across the Internet, and fragmentation and reassembly. According to the protocol, data may be transmitted by attaching a header with a destination address (IP address) and then transmitting the data packet from one computer to another until the data packet arrives at the desired destination. Along this journey, each computer uses an implementation of the IP Protocol to route the data packet to the next destination until the data packet reaches its final destination. Except for checking the integrity of the IP header, no error detection and/or recovery capabilities are performed. When the data packet arrives at its ultimate destination, any necessary integrity checks are carried out.

Another protocol—the transport protocol—serves as a layer responsible for guaranteeing the integrity of application data. The transport protocol is, therefore, used only at the original source and final destination of the data. The Internet currently uses two different transport protocols. One protocol, the User Datagram Protocol (UDP), does not offer reliable connectionless services. In practice, therefore, it is up to the target application to check data integrity. In contrast, the Transmission Control Protocol (TCP), another transport protocol, provides reliable connection-oriented service, which establishes a connection with a remote computer and guarantees data integrity and delivery (or notifies the application in case of an error).

Both TCP and UDP data transmissions each provide specific headers, in addition to the IP header. In order to simplify forwarding the data packets to a target application, these headers include a port number. The port number functions to identify an application-level protocol. Port number 80, for instance, is normally used for the World Wide Web protocol (Hypertext Transport Protocol or HTTP).

TCP/IP and UDP/IP refers to the IP Protocol combined with the TCP and the UDP, respectively. Normally, application programs communicate with an available TCP/IP implementation (e.g., Windows "WinSock") through an Application Programming Interface (API). For Windows computers, the WinSock API simply encapsulates the TCP/IP architecture. WinSock is patterned after the popular Berkeley Sockets programming model, which is generally considered the de facto standard for TCP/IP networking.

Internet applications generally implement more specialized protocols on top of TCP/IP. For example, a Web browser implements the client portions of the HyperText Transfer Protocol (HTTP) in order to communicate with Web servers. A Web browser also might implement other protocols, such as the older File Transfer Protocol (FTP) for downloading data. Electronic mail applications (i.e., E-mail clients) implement the client portion of the Simple Mail Transfer Protocol (SMTP) and the Post Office Protocol (POP). Still other protocols exist for use in the Internet, many of which are documented in the technical, trade, and patent literature. See, for example, the Internet Engineering Task Force (IETF) RFCs ("Requests For Comments") publications available from the Internet Network Information Center (NIC), via FTP access to the NIC archive nic.ddn.mil. Due to the accelerated development of the Internet, many more protocols are unpublished and/or are. in developmental stages. As long as a client application and a corresponding server application understand how to interpret the data packets they exchange, this generally does not pose a major problem. For applications that monitor the Internet traffic in order to detect security or other problems, however, this does pose an additional challenge. Accordingly, various illustrative embodiments of the present invention may be constructed to facilitate accommodation of new protocols.

LAN-Based Illustrative Embodiments

Figure 3:
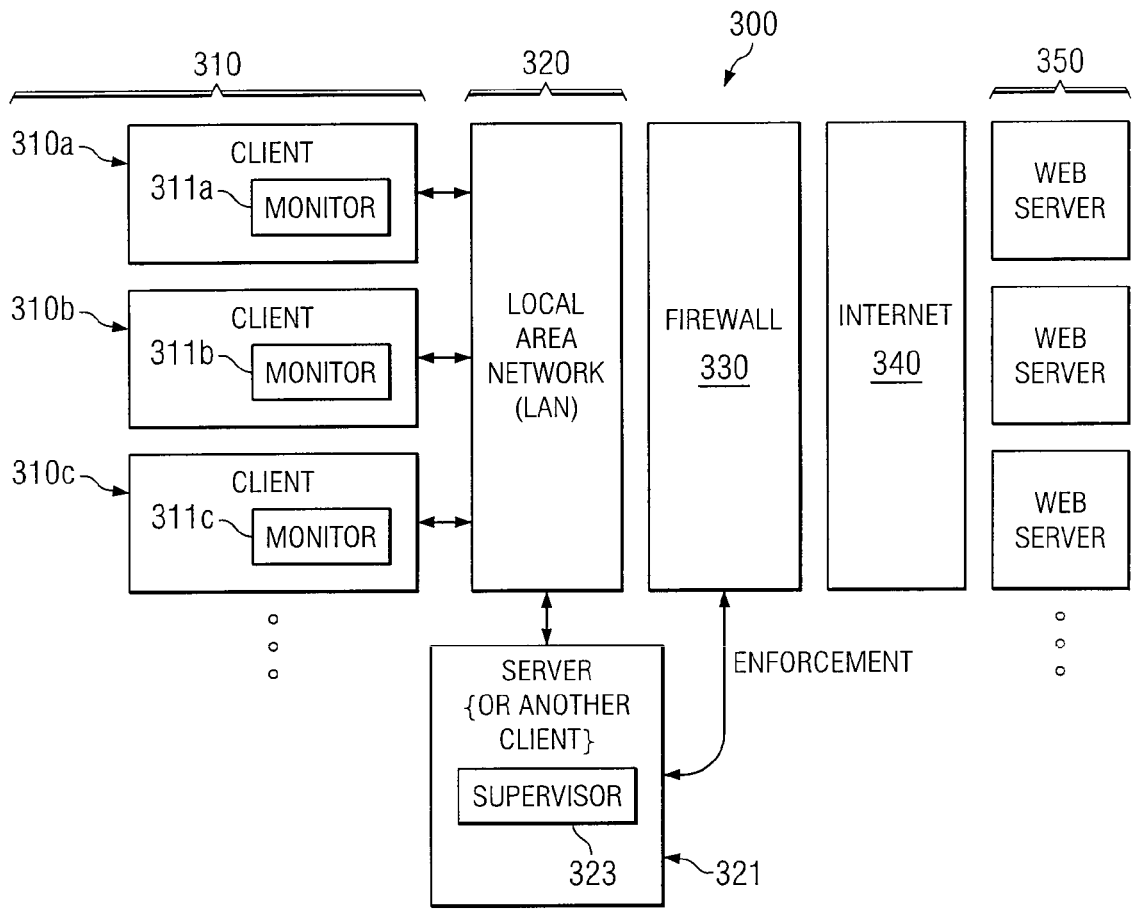
FIG. 3 schematically illustrates a block diagram showing an overview of an Internet-based (client/server) system, according to teachings of the present disclosure.

FIG. 3 provides an overview of an Internet-based (client/server) system 300 in which various illustrative embodiments may be embodied. As shown, the Internet-based (client/server) system 300 may include multiple clients 310 (e.g., clients 310*a*, 310*b*, 310*c*, . . . , each of which may comprise a personal computer or PC and/or a workstation, such as the computer system 100) connected to a local area network (LAN) 320, such as a Windows NT LAN (available from Microsoft Corporation of Redmond, Wash.). Each of the clients 310*a*, 310*b*, 310*c*, . . . , may include a client-side monitoring component for monitoring Internet access in accordance with the present disclosure, as specifically shown at 311*a*, 311*b*, 311*c*, . . . , for example. The local area network (LAN) 320 may be connected to a server 321 (and/or another client) having a supervisor and/or verifier component 323. The supervisor component 323 may provide independent verification of the clients 310*a*, 310*b*, 310*c*, . . . , for allowing or disallowing requests of each particular client. In effect, the supervisor component 323 may direct runtime monitoring operations.

The local area network (LAN) 320 itself may be a server-based network (e.g., a Windows NT Server providing services to network clients) or, alternatively, a peer-to-peer network. Communications to the outside (e.g., the Internet) may be achieved using TCP/IP. The local area network (LAN) 320 may communicate with the Internet, shown at 340, through a "firewall" 330, for example. The firewall 330 itself may be implemented in a conventional manner, such as by employing a router-based and/or server-based firewall process for monitoring communications with various Web servers 350 connected to the Internet 340.

Figure 4:
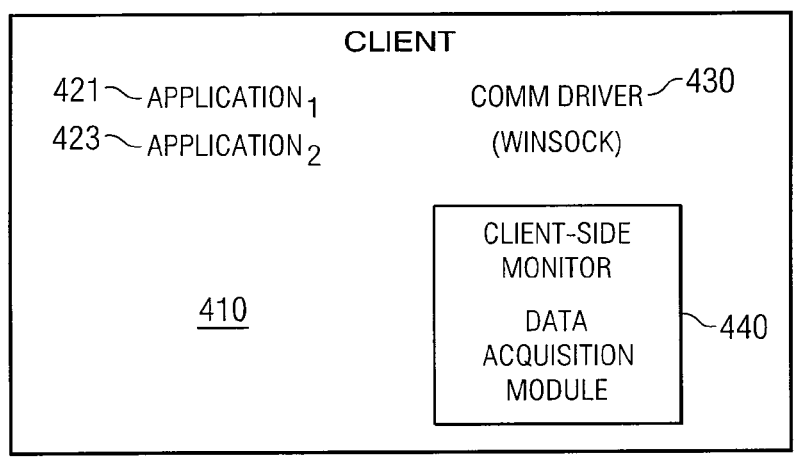
FIG. 4 schematically illustrates a block diagram of client-side operation of an Internet-based (client/server) system, according to teachings of the present disclosure.

With reference to FIG. 4, client-side operation of the Internet-based (client/server) system 300 is shown in further detail. As shown in FIG. 4 for client 410, a given client generally may include one or more applications (e.g., application₁ 421 and/or application₂ 423) that require Internet access. A Web browser (e.g., Netscape Navigator® and/or Microsoft Internet Explorer® and/or Mozilla Firefox browser software) is but one of a multitude of such applications. Each application, in turn, may communicate directly with a client-side communication driver 430, such as a Winsock driver, a Windows implementation and encapsulation of TCP/IP.

The client 410 may include a client-side monitor, such as a data acquisition module 440, that "hooks into" the client-side communication driver 430. In the instance of a Windows Winsock client-side communication driver 430, for example, a process may hook into the Windows Winsock client-side communication driver 430 using Winsock VxD extensions. As the various applications submit requests to the client-side communication driver 430, the data acquisition module 440 may intercept the communications for determining whether the request is permitted under the rules. For instance, when a request for access is received from an application, the data acquisition module 440 may first verify that, according to the rules in place, such an application is permitted to access the Internet. Rules currently in force might specify that only particular applications (or particular versions of those applications) may access the Internet, with all other applications being denied access, for example. For a Winsock-based implementation, the data acquisition module 440 may, in effect, trap the request at the VxD driver level, thereby effectively blocking the request at the level of the Winsock client-side communication driver 430.

In addition to checking whether the application itself should have access, the data acquisition module 440 may monitor the individual messages that are exchanged between the applications (e.g., the application, 421 and/or the applications 423) and the client-side communication driver 430. For instance, the data acquisition module 440 may trap an HTTP "SEND" command generated by an application. By analyzing the message and any accompanying context information, the data acquisition module 440 may determine whether the command is permitted under the rules in place. By examining port address context information provided with the command, for example, the data acquisition module 440 may readily determine the underlying protocol. For Web server access, the data acquisition module 440 may identify HTTP, the underlying protocol used to communicate with the Web. Having determined the protocol, the data acquisition module 440 may verify that the protocol is permitted for the application (and/or for the client). As an example of a typical rule that might be in place, one or more researchers of software and/or malicious code might establish a rule blocking FTP (file transfer protocol) by Web browsers, for preventing users from tying up the network with large FTP file transfers.

For determining whether the requested access of the client's application is accessing a permitted Web site, the data acquisition module 440 may examine the IP address for the Web site with which the application seeks to communicate and may compare that address against a list of allowed addresses (or conversely against a list of disallowed addresses). Certain Web sites may have multiple IP addresses. Accordingly, the Internet-based (client/server) system 300 may store the IP addresses with the respective Web sites, so that a particular Web site may be resolved at the level of its individual IP addresses. In this manner, the Internet-based (client/server) system 300 may permit access based either on a Web site name (e.g., www.ca.com) or based on a particular IP address.

Figure 5:
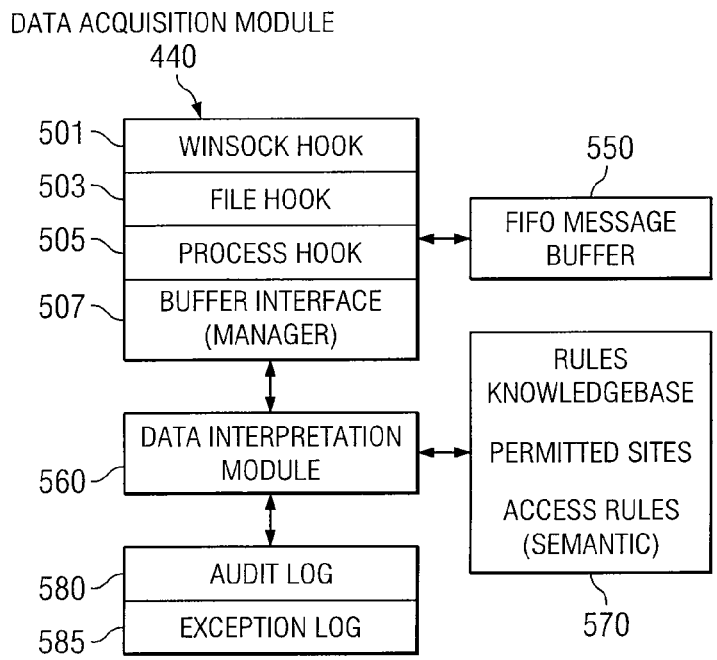
FIG. 5 schematically illustrates a diagram of a client-side monitor or data acquisition module, according to teachings of the present disclosure.

As shown in FIG. 5, the client-side monitor, such as the data acquisition module 440, that may be implemented as a Windows VxD driver, for example, may include the following subcomponents. A Winsock hook 501 may include functionality for connecting or "hooking" into the Winsock client-side communication driver 430. A file hook 503, in a similar manner, may include functionality allowing the data acquisition module 440 to hook into the file subsystem provided by the underlying operating system (OS) 240. A process hook 505, another subcomponent that may hook into the underlying operating system (OS) 240, may track all currently-executing applications (e.g., the application₁ 421 and/or the application₂ 423) and/or processes. All of these hooks, as implemented in a Windows VxD, may be capable of executing at ring 0, that is, execution at the highest privileged level of the operating system (OS) 240.

Also shown, the data acquisition module 440 may include a buffer interface (manager) 507 that may interface directly with a client system-maintained FIFO (first-in, first-out) message buffer 550. The FIFO message buffer 550 may comprise an array of messages maintained in a fixed-size (i.e., pre-allocated) block of client memory. The FIFO message buffer 550 itself may be shared between the data acquisition module 440 and the various other executing applications (e.g., the application₁ 421 and/or the application₂ 423) and/or processes. In various illustrative embodiments, the data acquisition module 440 may utilize the shared FIFO message buffer 550 so that the data acquisition module 440 itself need not undertake various allocation/deallocation operations that might degrade performance, for example.

Actual access to individual messages within the FIFO message buffer 550 may be achieved by mapping globally-accessible selectors, thus permitting the data acquisition module 440 to have the ability to access individual messages (and/or the content thereof) within the FIFO message buffer 550. With direct access to the underlying messages themselves, the data acquisition module 440 may patch (i.e., modify) dynamically at runtime the content of various messages. For instance, a request to access a particular Web site may be patched instead to redirect that request to another site. More generally, since the data acquisition module 440 may trap individual messages, individual messages may be modified in an arbitrary manner according to the rules in place, including disallowing (i.e., blocking) specific messages, for example.

Actual interpretation of individual messages may be performed by a data interpretation module 560 that co-exists with the data acquisition module 440. The data interpretation module 560, which may communicate directly with the data acquisition module 440, may keep track of all currently-executing processes. To determine intelligently the action that should be undertaken for a given message, the data interpretation module 560 may refer to a rules database and/or a rules knowledgebase 570. Here, the various rules that define permitted activity in the Internet-based system may be stored in a format that is readily accessible by the data interpretation module 560. Contained within the rules database 570 may be individual databases fully characterizing the rules for the Internet-based (client/server) system 300 that are not administrator-specified, but rather specified, as described in more detail below in reference to FIG. 6, by one or more researchers of software and/or malicious code. When the data interpretation module 560 is first loaded at a given client machine 410, the given client machine 410 may attempt to download a copy of those Internet-based (client/server) system 300 rules pertinent to the given client 410 from the supervisor component 323, for example, into the local knowledgebase 570 of the given client machine 410. In the event that such a copy is not available (or has not changed since the last download), the data interpretation module 560 may employ the last downloaded local copy.

Finally, the data interpretation module 560 may maintain log information, including an audit (transaction) log 580 and/or an exception log 585. The audit (transaction) log 580 may provide a time-sequence log of messages processed by the Internet-based (client/server) system 300, whereas the exception log 585 may provide a time-sequence log of exceptions (e.g., access violations attempted by users) that have occurred in the system.

Figure 6:
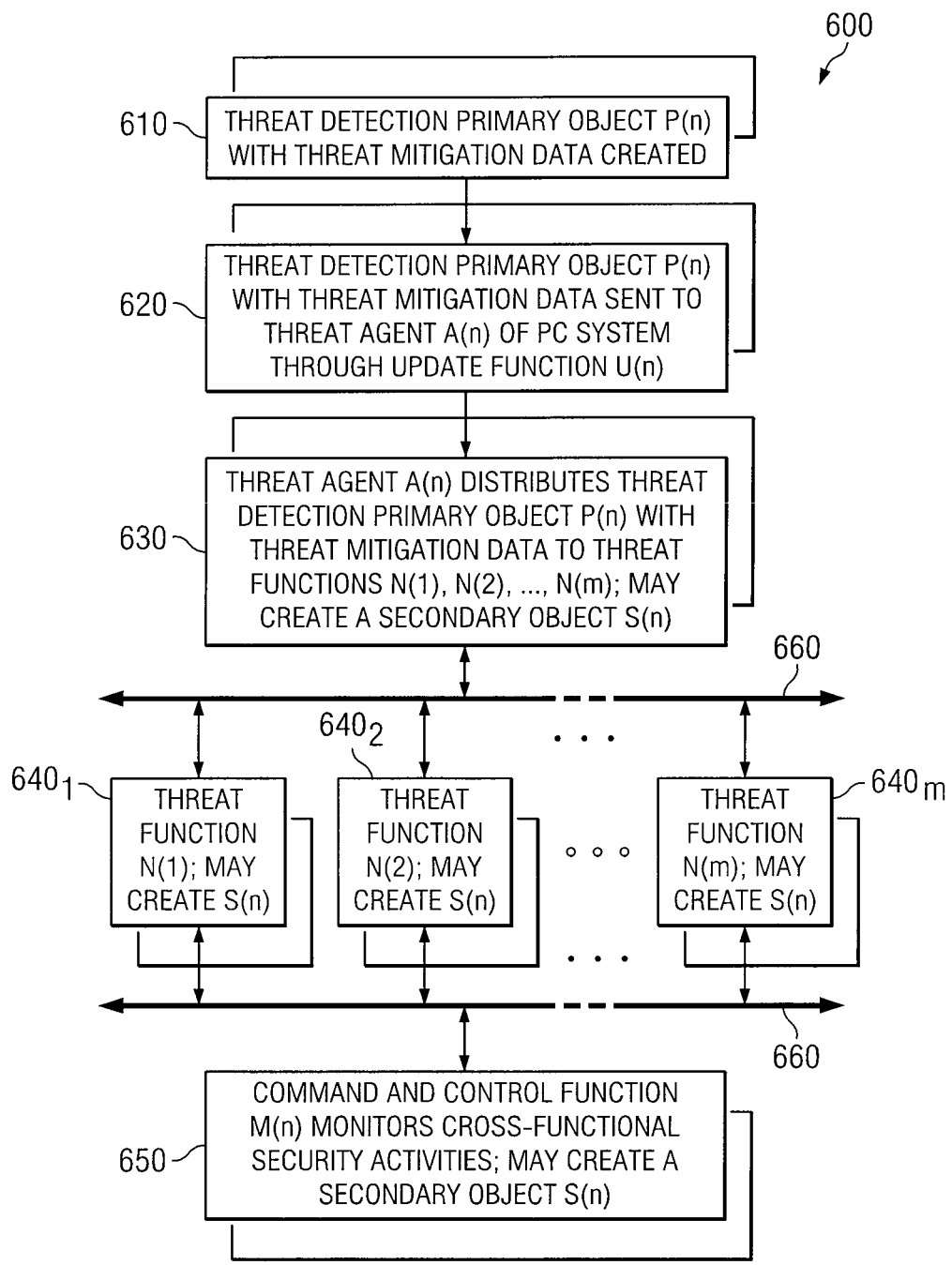
FIG. 6 schematically illustrates an exemplary embodiment of a method and system for a content-driven threat management system, according to teachings of the present disclosure.

Referring to FIG. 6, an exemplary embodiment of a method and system for a content-driven threat management system 600 is schematically illustrated, according to teachings of the present disclosure. In various illustrative embodiments, the content-driven threat management system 600 may comprise at least six objects, a threat detection primary object P(n) with threat mitigation data, as indicated at 610, where n may be any appropriate integer, a transmission vector update function U(n), as indicated at 620, a threat agent A(n), as indicated at 620 and 630, one or more threat functions N(m), such as a plurality of threat functions N(1), N(2), . . . , N(m), as indicated at 640$_1$, 640$_2$, . . . , 640$_m$, where m may be any appropriate non-zero integer, a command and control monitor function M(n), as indicated at 650, and a secondary object S(n), as indicated at 630, 640$_1$, 640$_2$, . . . , 640$_m$, 650. The total number of objects used and/or the number of relationships between those objects may be effectively unlimited, as would be apparent to those of ordinary skill in the art having the benefit of the present disclosure.

In various illustrative embodiments, the threat detection primary object P(n) with threat mitigation data, as indicated at 610, may be created by one or more researchers of software and/or malicious code, which may include one or more automated researcher and/or automated research systems built to develop threat information, and may include code and data than can be run on the computing system, as described above with reference to the rules knowledgebase 570, but may be at least one functional threat migitation mechanism and/or functional threat description mechanism. In various particular exemplary illustrative embodiments, the at least one functional threat migitation mechanism and/or functional threat description mechanism may include one or more of spyware, a firewall, anti-virus (AV) software, spam filter information, Trojan Horse information, universal resource locator (URL) filtering, universal resource locator (URL) management, policy configuration, "threat posture information," and the like, and any other computer security threat detection and/or mitigation software applications that may arise and/or be developed, as appropriate. For example, a threat might comprise a Trojan Horse that is downloaded through a graphics file that is present on the whole page of a commercial website. The Trojan Horse, once installed and run on the system, might use a certain port on a firewall to contact another device on the inrernet, which then downloads and installs a rootkit, or keylogger, or other such spyware code. The functional threat mitigation mechanism in this case would be a detection for the rootkit and keylogger, a deactivation object to disable and remove the rootkit and keylogger, an instruction to deactivate the port in use by the Trojan Horse, and a dectection and removal of the worm, the Trojan Horse, the graphics file, and then a disabling of the ability of the user to connect to that website and/or download graphics from that website again. The system might also communicate back to the researchers to deepen the research information. In various illustrative embodiments, the threat detection primary object P(n) with threat mitigation data created by one or more researchers of software and/or malicious code may be one of a set of Z threat detection primary objects P(1), P(2), . . . , P(Z), where Z may be any appropriate integer, each with their particular threat mitigation data, for example. Primary objects may also be combined into a global object, as necessary, to mitigate the threat.

The one or more researchers of software and/or malicious code, which may include one or more automated researcher and/or automated research systems built to develop threat information, may develop the threat detection primary object P(n) with threat rmitigation data, as indicated at 610, and encode the threat detection primary object P(n) with threat mitigation data within an object, such as one or more specific databases of threat objects, that may be transmitted to the threat agent A(n) of a personal computer (PC) syster, such as the Internet-based (client/server) system 300, as described above, using the transmission vector update fuinction U(n), as indicated at 620. The transmission vector update function U(n) may be defined, in various illustrative embodiments, as the method used to manage the distribution of the threat detection primary object P(n) with threat mitigation data. Other transmisstion methods may also be employed, as would be apparent to those of ordinary skill in the art having the benefit of the present disclosure.

The threat detection primary object P(n) with threat mitigation data may be received by the threat agent A(n). The threat agent A(n) may then update the available threat functional descriptions of one or more threat functions N(m), such as the plurality of threat functions N(1), N(2), . . . , N(m), as indicated at 640$_1$, 640$_2$, . . . , 640$_m$, to include the new threat detection primary object P(n) with threat mitigation data, as indicated at 630. In various illustrative embodiments, the threat agent A(n) may be (1) resident on a single system, such as the Internet-based (client/server) system 300, as described above, in a non-distributed framework, (2) found in a trusted relationship with a different system, such as the Internet-based (client/server) system 300, as described above, on a network in a distributed framework, and/or (3) found in a trusted relationship with a different system, such as the Internet-based (client/server) system 300, as described above, on a set of networks and/or systems in a distributed framework.

The one or more threat functions N(m), such as the plurality of threat functions N(1), N(2), . . . , N(m), as indicated at 640$_1$, 640$_2$, . . . , 640$_m$, may utilize the information in the threat detection primary object P(n) with threat mitigation data as appropriate. For example, in the event that the threat function N(1) recognizes a threat event based upon the threat detection primary object P(n) with threat mitigation data, the threat function N(1) may respond as directed by the threat detection primary object P(n) with threat mitigation data and may execute one or more of the functions of the threat function N(1), one of which may be to communicate to either the threat agent A(n), another threat function such as N(2), and/or the command and control monitor function M(n), as indicated schematically at 660.

Primary and secondary objects may be held for a time so that their effects might be considered by a user and/or a manager and/or a participator of a system. That manager may deploy substantially all or only a part of the threat mitigation data.

These subsequent objects, either the threat agent A(n), another threat function such as N(2), and/or the command and control monitor function M(n), may then execute one or more of their function appropriate responses, which may include creating and/or developing the secondary object S(n), as indicated at 630, 640$_1$, 640$_2$, . . . , 640$_m$, 650, which may then be communicated to all appropriate objects such as the threat agent A(n), one or more threat functions N(m), such as the plurality of threat functions N(1), N(2), ..., N(m), as indicated at $640_1, 640_2, ..., 640_m$, and/or the command and control monitor function M(n), as indicated schematically also at 660. For example, the threat mitiation data may add a detection for a certain example of spyware. The spyware agent may instruct a firewall, such as the firewall 330, as described above, to shut a certain port. The firewall 330 may then create an additional secondary object S(n) that is then communicated to the appropriate applications that might be able to use that certain port to tell these appropriate applications that that certain port has been closed. Similarly, should a primary object contain a threat mitigation for a rootkit, the primary object may disable access to certain-web sites with URL filtering and/or look in a list of e-mail messages for a particular item of spam and/or contact the researcher(s), which may include one or more automated researcher(s) and/or automated research system(s) built to develop threat information, and/or the manager(s) to inform them of the presence of the rootkit and/or other type of malicious code.

Similarly, and more generally, in the event that the threat function N(m), where m may be any appropriate non-zero integer, recognizes a threat event based upon the threat detection primary object P(n) with threat mitigation data, the threat function N(m) may respond as directed by the threat detection primary object P(n) with threat mitigation data and may execute one or more of the functions of the threat function N(m), one of which may be to communicate to either the threat agent A(n), another threat function such as one or more of the threat functions N(k) of the plurality of the threat functions N(1), N(2), ..., N(m), where k≠m, and/or the command and control monitor function M(n), as indicated schematically at 660.

These subsequent objects, either the threat agent A(n), another threat function such as one or more of the threat functions N(k) of the plurality of the threat functions N(1), N(2), ..., N(m), where k≠m, and/or the command and control monitor function M(n), may then execute one or more of their function appropriate responses, which may include creating and/or developing the secondary object S(n), as indicated at 630, $640_1, 640_2, ..., 640_m$, 650, which may then be communicated to all appropriate objects such as the threat agent A(n), one or more threat functions N(m), such as the plurality of threat functions N(1), N(2), ..., N(m), as indicated at $640_1, 640_2, ..., 640_m$, and/or the command and control monitor function M(n), as indicated schematically also at 660. In various illustrative embodiments, a manager and/or a user and/or a participator may review the information found at a command and control console having the command and control monitor function M(n), and may determine one or more other appropriate secondary objects S(n) that may need to be created and distributed and/or communicated, to all appropriate objects such as the threat agent A(n), and/or one or more threat functions N(m), such as the plurality of threat functions N(1), N(2), ..., N(m), as indicated at $640_1, 640_2, ..., 640_m$, as described above.

Figure 7:
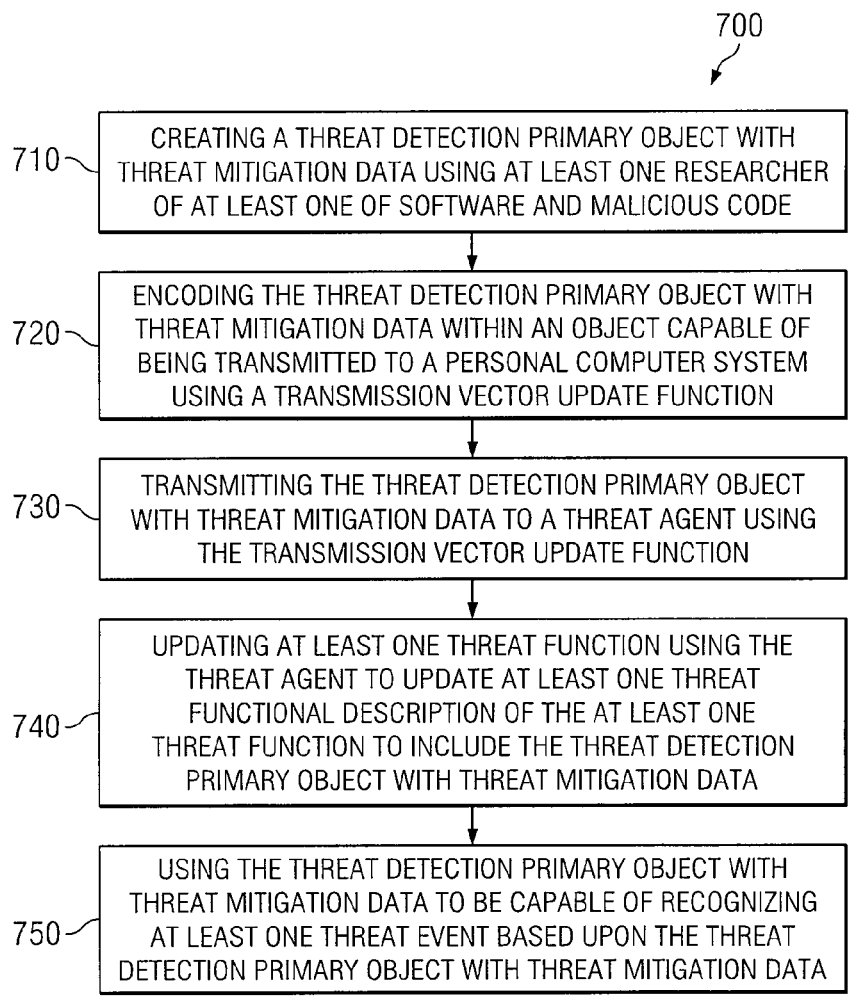
FIG. 7 schematically illustrates a method for a content-driven threat management system, according to teachings of the present disclosure.

In various illustrative embodiments, as shown in FIG. 7, a method 700 for a content-driven threat management system may be provided. The method 700 may comprise creating a threat detection primary object with threat mitigation data using at least one researcher of at least one of software and malicious code, as indicated at 710, and encoding the threat detection primary object with threat mitigation data within an object capable of being transmitted to a personal computer system using a transmission vector update function, as indicated at 720. In various illustrative embodiments, the at least one researcher of at least one of software and malicious code may include one or more automated researcher and/or automated research systems built to develop threat information.

The method 700 may also comprise transmitting the threat detection primary object with threat mitigation data to a threat agent using the transmission vector update function, as indicated at 730, and updating at least one threat function using the threat agent to update at least one threat functional description of the at least one threat function to include the threat detection primary object with threat mitigation data, as indicated at 740. The method 700 may also comprise using the threat detection primary object with threat mitigation data to be capable of recognizing at least one threat event based upon the threat detection primary object with threat mitigation data, as indicated at 750.

As described above, the system and method disclosed herein are advantageous in providing a mechanism for relaying content-driven threat information to the various functions that are enabled in a threat management system. In various illustrative embodiments, information created by content, such as the detection of a specific threat, is enabled to be transmitted to another threat management function, allowing that other threat management function to reconfigure itself to respond to the new information. The system and method disclosed herein are still further advantageous in providing a flexible and extensible framework for the conception, transmission, configuration, and management, of cross-function threat mitigation and management events, thereby meeting the challenge of threat mitigation, which can only be met by a combination of threat management technologies operating in a meaningful orchestration that is content-driven and specific. The system and method disclosed herein are yet further advantageous in improving the performance and security of business critical applications and, hence, in improving the user and/or customer experience.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages- are described in detail, a person skilled in the art having the benefit of the present disclosure could make various alterations, additions, and/or omissions without departing from the spirit and scope of the present invention, as defined by the appended claims.

What is claimed is:

1. A method for a content-driven threat management system, the method comprising:
   creating a threat detection primary object with threat mitigation data using at least one researcher of at least one of software and malicious code;
   encoding the threat detection primary object with threat mitigation data within an object capable of being transmitted to a personal computer system using a transmission vector update function;

transmitting the object comprising the encoded threat detection primary object with threat mitigation data to a threat agent using the transmission vector update function;

updating a first threat function using the threat agent to update at least one first threat functional description of the first threat function to include the threat detection primary object with threat mitigation data, the first threat function consisting of a first element chosen from the group consisting of a firewall, an anti-virus program, an anti-spyware program, a universal resource locator (URL) filter, and a URL management program;

updating a second threat function using the threat agent to update at least one second threat functional description of the second threat function to include the threat detection primary object with threat mitigation data that was included in the first threat functional description, the second threat function consisting of a second element chosen from the group, the second element different from the first element;

using the threat detection primary object with threat mitigation data to recognize at least one threat event based upon the threat detection primary object with threat mitigation data;

responding, by the first threat function, to the at least one threat event as directed by the threat detection primary object by executing one or more functions of the first threat function; and responding, by the second threat function, to the at least one threat event as directed by the threat detection primary object by executing one or more functions of the second threat function.

2. The method of claim 1 further comprising:

responding to the at least one threat event as directed by the threat detection primary object with threat mitigation data, including executing at least one function of the first threat function, comprising at least communicating to at least one of the threat agent, the second threat function, and a command and control monitor function; and executing at least one function of the at least one of the threat agent, the second threat function, and the command and control monitor function, each capable of developing a secondary object capable of being communicated to at least one of the threat agent, the first threat function, the second threat function, and the command and control monitor function, wherein the threat detection primary object with threat mitigation data further comprises at least one of a functional threat mitigation mechanism and a functional threat description mechanism.

3. The method of claim 2, wherein the threat detection primary object with threat mitigation data further comprising the at least one of the functional threat mitigation mechanism and the functional threat description mechanism further comprises at least one of spyware, a firewall, anti-virus software, spam filter information, Trojan Horse information, universal resource locator filtering, universal resource locator management, policy configuration, and threat posture information.

4. The method of claim 1, wherein the threat agent is at least one of resident on a single system in a non-distributed framework, found in a trusted relationship with a different system on a network in a distributed framework, and found in the trusted relationship with the different system on a set of networks and systems in the distributed framework.

5. The method of claim 2, wherein the threat agent is at least one of resident on a single system in a non-distributed framework, found in a trusted relationship with a different system on a network in a distributed framework, and found in the trusted relationship with the different system on a set of networks and systems in the distributed framework.

6. The method of claim 3, wherein the threat agent is at least one of resident on a single system in a non-distributed framework, found in a trusted relationship with a different system on a network in a distributed framework, and found in the trusted relationship with the different system on a set of networks and systems in the distributed framework.

7. The method of claim 2 further comprising:

reviewing information found at a command and control console having the command and control monitor function, wherein reviewing information found at the command and control console is performed by at least one of a user, a manager, and a participator.

8. The method of claim 7 further comprising:

determining at least one more secondary object capable of being communicated to at least one of the threat agent, the first threat function, and the second threat function.

9. A method for a content-driven threat management system, the method comprising:

creating a threat detection primary object $P(n)$ with threat mitigation data using researchers of at least one of software and malicious code;

encoding the threat detection primary object $P(n)$ with threat mitigation data within an object capable of being transmitted to a personal computer system using a transmission vector update function $U(n)$;

transmitting the object comprising the encoded threat detection primary object $P(n)$ with threat mitigation data to a threat agent $A(n)$ using the transmission vector update function $U(n)$;

updating at least one threat function $N(m)$ using the threat agent $A(n)$ to update at least one threat functional description of the at least one threat function $N(m)$ to include the threat detection primary object $P(n)$ with threat mitigation data, the threat function $N(m)$ consisting of a first element chosen from a group consisting of a firewall, an anti-virus program, an anti-spyware program, a universal resource locator (URL) filter, and a URL management program;

updating at least one second threat function using the threat agent $A(n)$ to update at least one second threat functional description of the at least one second threat function to include the threat detection primary object $P(n)$ with threat mitigation data, the second threat function $N(m)$ consisting of a second element chosen from the group, the second element different from the first element;

using the threat detection primary object $P(n)$ with threat mitigation data to recognize at least one threat event based upon the threat detection primary object $P(n)$ with threat mitigation data;

responding, by the first threat function, to the at least one threat event as directed by the threat detection primary object $P(n)$ with threat mitigation data, including executing at least one function of the threat function $N(m)$, comprising at least communicating to at least one of the threat agent $A(n)$, at least one other threat function $N(k)$ where $k \neq m$, and a command and control monitor function $M(n)$;

responding, by the second threat function, to the at least one threat event as directed by the threat detection primary object $P(n)$ with threat mitigation data; and executing at least one function of the at least one of the threat agent $A(n)$, the at least one other threat function $N(k)$ where $k \neq m$, and the command and control monitor function $M(n)$, each capable of developing a secondary object S(n) capable of being communicated to at least one of the threat agent A(n), the at least one threat function N(m), the at least one other threat function N(k) where k≠m, and the command and control monitor function M(n).

10. The method of claim 9, wherein the threat detection primary object P(n) with threat mitigation data further comprises at least one of a functional threat mitigation mechanism and a functional threat description mechanism.

11. The method of claim 10, wherein the threat detection primary object P(n) with threat mitigation data further comprising the at least one of the functional threat mitigation mechanism and the functional threat description mechanism further comprises at least one of spyware, a firewall, anti-virus software, spam filter information, Trojan Horse information, universal resource locator filtering, universal resource locator management, policy configuration, and threat posture information.

12. The method of claim 9, wherein the threat agent A(n) is at least one of resident on a single system in a non-distributed framework, found in a trusted relationship with a different system on a network in a distributed framework, and found in the trusted relationship with the different system on a set of networks and systems in the distributed framework.

13. The method of claim 9 further comprising:
reviewing information found at a command and control console having the command and control monitor function M(n), wherein reviewing information found at the command and control console is performed by at least one of a user, a manager, and a participator.

14. The method of claim 13 further comprising:
determining at least one more secondary object S(n) capable of being communicated to at least one of the threat agent A(n), the at least one threat function N(m), and the at least one other threat function N(k) where k≠m.

15. A method for a content-driven threat management system, the method comprising:
creating a threat detection primary object P(n) with threat mitigation data using researchers of at least one of software and malicious code;
encoding the threat detection primary object P(n) with threat mitigation data within an object capable of being transmitted to a personal computer system using a transmission vector update function U(n);
transmitting the object comprising the encoded threat detection primary object P(n) with threat mitigation data to a threat agent A(n) using the transmission vector update function U(n);
updating a plurality of threat functions N(1), N(2), . . . , N(m) using the threat agent A(n) to update at least one threat functional description of each of the plurality of threat functions N(1), N(2), . . . , N(m) to include the threat detection primary object P(n) with threat mitigation data, each of the threat functions consisting of a distinct element chosen from the group consisting of a firewall, an anti-virus program, an anti-spyware program, a universal resource locator (URL) filter, and a URL management program;
using the threat detection primary object P(n) with threat mitigation data to recognize at least one threat event based upon the threat detection primary object P(n) with threat mitigation data;
responding, by the first threat function, to the at least one threat event as directed by the threat detection primary object P(n) with threat mitigation data, including executing at least one function of N(j), one of the plurality of threat functions N(1), N(2), . . . , N(m), comprising at least communicating to at least one of the threat agent A(n), at least one other threat function N(k) where k≠j, and a command and control monitor function M (n);
responding, by the second threat function, to the at least one threat event as directed by the threat detection primary object P(n) with threat mitigation data; and
executing at least one function of the at least one of the threat agent A(n), the at least one other threat function N(k) where k≠j, and the command and control monitor function M(n), each capable of developing a secondary object S(n) capable of being communicated to at least one of the threat agent A(n), at least one of the threat functions N(j) where j=1, 2, . . . ,m, and the command and control monitor function M(n).

16. The method of claim 15, wherein the threat detection primary object P(n) with threat mitigation data further comprises at least one of a functional threat mitigation mechanism and a functional threat description mechanism.

17. The method of claim 16, wherein the threat detection primary object P(n) with threat mitigation data further comprising the at least one of the functional threat mitigation mechanism and the functional threat description mechanism further comprises at least one of spyware, a firewall, anti-virus software, spam filter information, Trojan Horse information, universal resource locator filtering, universal resource locator management, policy configuration, and threat posture information.

18. The method of claim 15, wherein the threat agent A(n) is at least one of resident on a single system in a non-distributed framework, found in a trusted relationship with a different system on a network in a distributed framework, and found in the trusted relationship with the different system on a set of networks and systems in the distributed framework.

19. The method of claim 15 further comprising:
reviewing information found at a command and control console having the command and control monitor function M(n), wherein reviewing information found at the command and control console is performed by at least one of a user, a manager, and a participator.

20. The method of claim 19 further comprising:
determining at least one more secondary object S(n) capable of being communicated to at least one of the threat agent A(n) and at least one of the threat functions N(j) where j=1,2, . . . ,m.

21. The method of claim 1 further comprising:
creating, by the first threat function, a threat detection secondary object with threat mitigation data;
transmitting the threat detection secondary object from the first threat function to the second threat function; and
responding, by the second threat function, as directed by the threat detection secondary object.

* * * * *